(12) United States Patent
Alm et al.

(10) Patent No.: US 8,152,528 B2
(45) Date of Patent: Apr. 10, 2012

(54) INSTRUCTIONAL KITS, MAPS, AND RELATED METHODS

(75) Inventors: Brian R. Alm, Seattle, WA (US); Lisa Burgess, Seattle, WA (US)

(73) Assignee: Zebra Mix, Inc., Seattle, WA (US)

( * ) Notice: Subject to any disclaimer, the term of this patent is extended or adjusted under 35 U.S.C. 154(b) by 0 days.

(21) Appl. No.: 13/030,069

(22) Filed: Feb. 17, 2011

(65) Prior Publication Data

US 2011/0171615 A1      Jul. 14, 2011

Related U.S. Application Data

(63) Continuation of application No. 11/868,900, filed on Oct. 8, 2007, now abandoned.

(60) Provisional application No. 60/849,955, filed on Oct. 6, 2006.

(51) Int. Cl.
G09B 19/00 (2006.01)

(52) U.S. Cl. ............. 434/127; 426/87; 273/236; 99/324

(58) Field of Classification Search .................. 434/127; 426/48, 112, 120; 273/236; 99/324
See application file for complete search history.

(56) References Cited

U.S. PATENT DOCUMENTS

| | | | |
|---|---|---|---|
| 3,799,550 A | 3/1974 | Milana et al. | |
| 4,116,426 A | 9/1978 | Kessler | |
| 6,093,430 A | 7/2000 | Gupta | |
| 6,349,820 B1 | 2/2002 | Kelley et al. | |
| 6,974,131 B2 | 12/2005 | Frank | |
| 7,044,466 B2 | 5/2006 | Laibson et al. | |
| 2003/0173741 A1 | 9/2003 | Pellham | |
| 2005/0040051 A1 | 2/2005 | Martin | |

OTHER PUBLICATIONS

Office Action for U.S. Appl. No. 11/868,900, filed Oct. 8, 2007, mailed from the USPTO on Mar. 16, 2010, 14 pgs.
Office Action for U.S. Appl. No. 11/868,900, filed Oct. 8, 2007, mailed from the USPTO on Sep. 17, 2010, 15 pgs.

*Primary Examiner* — Gene Kim
*Assistant Examiner* — Joseph B Baldori
(74) *Attorney, Agent, or Firm* — John R. Thompson; Stoel Rives LLP

(57) ABSTRACT

Provided are embodiments of instructional maps providing instructions for creating a finished product—such as a finished food product—and kits—such as baking or cooking kits—which include one or more such instructional maps. The instructional maps preferably include a recipe in the form of a series of step-by-step instructions for creating a finished food. The instructional maps may also include one or more activities to be completed while making the food, such as games, quizzes, puzzles, experiments, foreign language activities, social interaction activities, and instructions for doing one or more physical exercises. Some embodiments may also include two sides made up of instructions, activities, facts, etc. which are respectively designed for users of different ages, genders, interests, etc.

8 Claims, 3 Drawing Sheets

INSTRUCTIONAL KITS, MAPS, AND RELATED METHODS

RELATED APPLICATIONS

This application is a continuation of U.S. patent application Ser. No. 11/868,900, filed Oct. 8, 2007, and titled "Instructional Kits, Maps, and Related Methods," which claims the benefit under 35 U.S.C. §119(e) of U.S. Provisional Patent Application No. 60/849,955, filed Oct. 6, 2006, and titled "Apparatus and Education Method for Preparing Food," which are hereby incorporated herein by reference in their entirety.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

Figure 1:
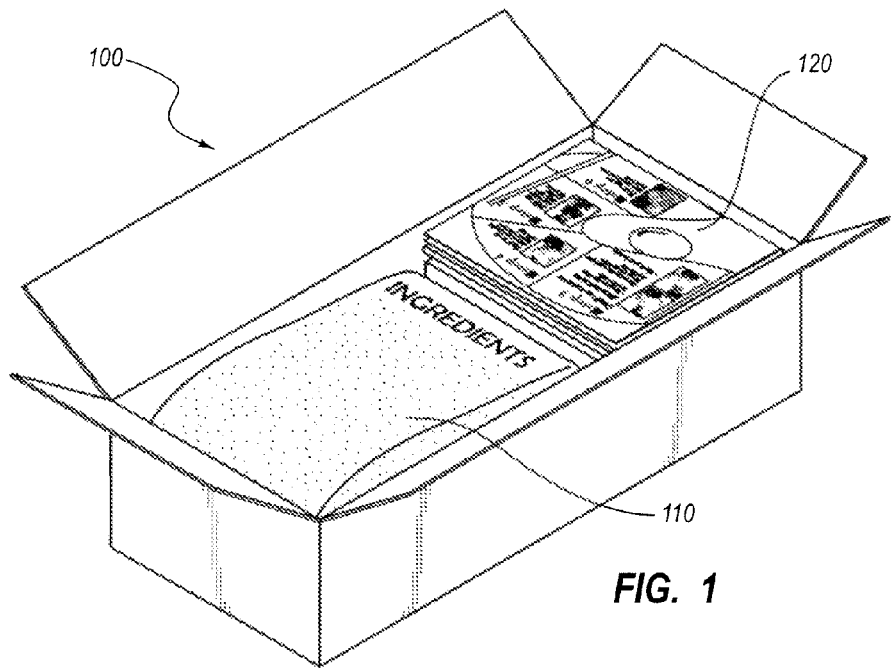
FIG. 1 is a perspective view of one embodiment of a food-making kit.

In the following description, numerous specific details are provided for a thorough understanding of specific preferred embodiments. However, those skilled in the art will recognize that the invention can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Disclosed are embodiments of kits, such as baking or cooking kits, for creating a finished product—such as a food, piece of art, craft, etc.—along with components of said kits and related methods and systems. Of course, it should be appreciated that the principles set forth herein may be applied to any other project the completion of which may be facilitated by presenting a series of step-by-step instructions. In embodiments in which the finished product comprises a finished food, the food may comprise any food that can be made in a series of steps, such as brownies, cupcakes, cookies, cakes, pizza, noodle dishes, etc. Instructions for creating the food may be provided in the form of a "map" included with the kits. The map may include preparation instructions, such as a series of step-by-step instructions for creating a finished food. In some embodiments, the map may also include a list of suggested tools and/or a list of ingredients to be used in creating the finished food.

In preferred embodiments, activities may also be included on the map. Such activities may include, for example, games, quizzes, puzzles, experiments, foreign language, social interaction, and instructions for doing one or more physical exercises. Preferably, one or more (or all) of the activities relate to the instructions. The activities may provide opportunities for teaching/learning. For example, the activities may incorporate science, math, word games, reading, nutritional facts, foreign language instruction, social interaction games, and the like.

It should be understood that the term "activity," as used herein, refers to written materials which require physical actions from a user, such as requiring a user to write, perform an experiment, have a conversation with another person, play a game, etc. These activities, however, are distinct from the actions required to create the finished product. Thus, for example, an instructional map for baking brownies might call for a user to crack an egg, but this would not be considered an "activity" because it is required in order to make the brownies. On the other hand, written materials in the instructional map which call for the user to, for example, spin the egg as part of a game, would be considered an "activity."

The instructional map may be folded, similar to a standard map, and included in the kit, along with one or more ingredients for creating the finished food. The map may also include two distinct sides designed for different groups of people. In some embodiments, a first side may comprise a first plurality of instructional steps for creating a finished food and designed for children in a first age group, and a second side may comprise a second plurality of instructional steps for creating a finished food and designed for children in a second age group distinct from the first age group. Thus, for example, a first side may be a "level one" map and the opposite side may be a "level two" map. The level one map may be designed for children in a first age group—children ages 4-8, for example. The level two map may be designed for children in a second age group—children ages 9 and up, for example. In other embodiments the two sides may be respectively designed for persons having other differing characteristics, such as different genders, interests, abilities, personality types, etc.

In addition, in some embodiments, some or all of the instructions may include select words which are designed to be visually conspicuous vis-à-vis the other words in the instruction, such that young children just learning to read may be able to generally follow the instructions by referring to the conspicuous words. The conspicuous words may be larger, bold, of a different font, different color, etc. In other embodiments, the instructions may solely comprise pictures. In such embodiments, children who are not yet able to read may be able to complete, or at least participate, in one or more steps by referring to the pictures.

In preferred embodiments, the instructional map may be configured such that each of the step-by-step instructions for creating the finished food is visible on a single side of the instructional map. Thus, for embodiments including two sides designed respectively for different groups of people, a first side may include a first full set of step-by-step instructions, each of which is visible on the first side, and a second side may include a second full set of step-by-step instructions, each of which is visible on the second side. As such, only a single side of the map need be used in order to create the finished food and participate in the related activities.

As alluded to above, some embodiments of the invention are designed for children. However, adult supervision may be needed for some implementations. For example, if the process of creating the finished food comprises baking, an adult may need to supervise and/or assist in creating the finished food at certain points during the process. As such, some instructional maps may include one or more instructions directed to an adult. To facilitate adult supervision at appropriate points and allow children to be involved in the process and interact with their parents and/or other adults, the instructional maps may therefore comprise one or more visual indications that an adult should be involved in one or more of the steps. For example, a star may be included with each instruction that requires adult involvement and/or supervision. One or more of the instructions may also include an image or images showing the instruction(s) being completed.

The maps are preferably large enough to provide a working surface for performing one or more of the instructions and/or activities. For example, in one embodiment, the map is 18 inches by 24 inches once unfolded. To the extent that one or more steps in the recipe are performed on a surface of the map, cleanup following completion of the food-making process is made easier. To further facilitate performing one of more of the recipe steps on the map itself, one or more visual indicators may also be provided which indicate a location on the map for placement of at least one of the suggested tools. For example, a circle may be placed on the map for placement of a bowl used in mixing ingredients for creating the finished food. Words may also be included with the visual indicator(s). For example, the words "place mixing bowl here" may be placed within the circle on the map.

The instructional maps may take one or more of several forms. For example, the maps may be coated plastic, uncoated plastic, or paper stock. Other contemplated forms for instructional maps include, without excluding other forms now known or later developed, place mats, fabric patterns for an apron or t-shirt, test prints for a printer, coloring books, jigsaw puzzles, and stand-alone board games.

In some embodiments, the instructional maps may include a sequential path within which the recipe instructions are provided. For example, the steps may be visually arranged as distinct portions of a pathway extending about the single surface from a first step to a final step. The activities and/or illustrations may be placed over or adjacent to the steps, or on any other suitable location on the map.

Various embodiments of the invention may allow a child to turn a chore (such as baking, cooking, or otherwise creating a finished food) into a game. Other embodiments may provide, for example, ESL exercises, language comprehension, cultural training, training for brain-injured people to re-establish neural pathways, activities for seniors, such as occupants of a senior or other assisted living center, evaluations of Attention Deficit Disorder (ADD) and/or other disorders, chemistry or other science experiments, occupational therapy retraining after an injury, color charts and/or color therapy, math, nutrition, and/or vocabulary tutorials, etc.

In preferred embodiments, one or more of the activities illustrated on the maps may be performed by writing on the map itself. For example, a mystery may be presented with clues and a table or chart to correlate the clues in solving the mystery. As another example, a word search or puzzle may be presented, which requires writing on the map to complete. As still another example, a time trial may be presented that asks the participant to complete various tasks, some or all of which may be related to completing the steps for making the finished food. The completion time(s) may be tracked by writing on the map. The user may also write on the instructional map to keep track of which steps have been completed. For example, a plurality of empty boxes corresponding with each of the plurality of instructional steps may be included on the map. The user may then place a mark, such as a check mark, within each of the boxes as each of the instructional steps are completed.

Specific embodiments of the invention will now be described in greater detail with reference to the accompanying drawings. FIG. 1 illustrates a kit 100. Kit 100 includes a bag 110 containing one or more ingredients for making a finished food. Kit 100 also includes an instructional map 120, which is shown in the figure folded up as a conventional map would be when not in use.

Figure 2:
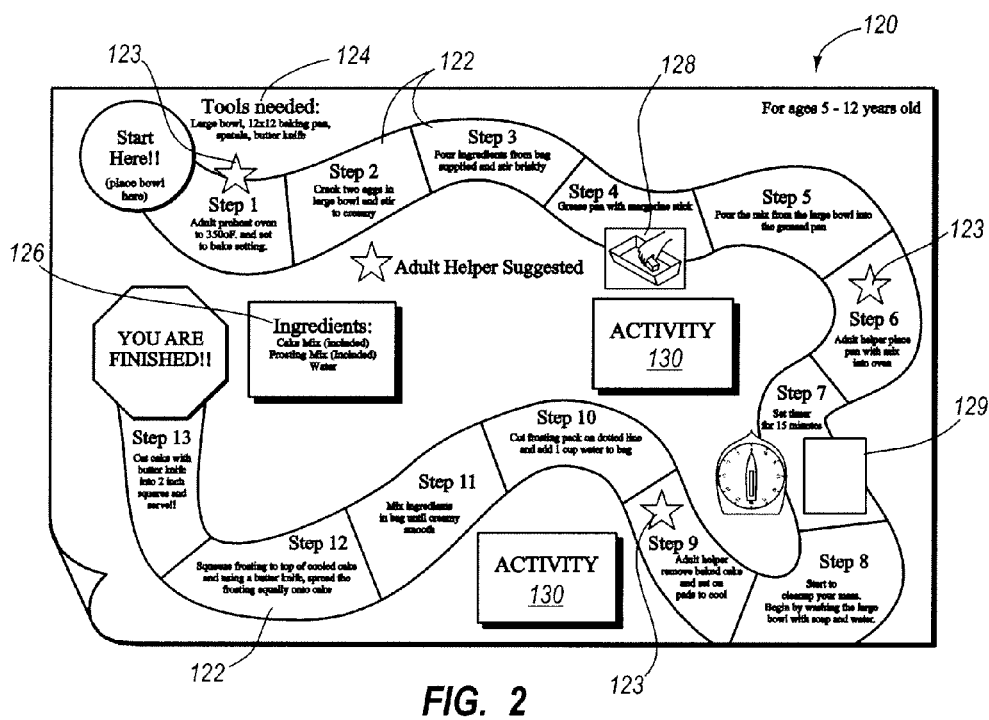
FIG. 2 depicts one side of one embodiment of an instructional map included in the food-making kit of FIG. 1 after the instructional map has been unfolded.

FIG. 2 depicts map 120 after it has been removed from kit 100 and unfolded. Map 120 includes a plurality of instructional steps 122 for making a finished food (cake). As shown in FIG. 2, the instructional steps 122 are visually arranged as distinct portions of a pathway extending about the single surface from a first step 1 to a final step 13. It can also be seen that three of the steps (steps 1, 6, and 9) have a star 123 positioned on or adjacent to the steps. As indicated on the map 120, these stars 123 are intended to represent the suggestion for adult supervision and/or participation in their accompanying steps. Of course, other graphical symbols or indicators may be used in other embodiments to notify a user that involvement by another, such as an adult, is needed or suggested in one or more steps.

In addition, map 120 includes a list of tools 124 and a list of ingredients 126 for creating the finished food. Two images 128 and 129 are also included on the map 120, each of which depicts an instruction or step from map 120 being completed. More particularly, image 128 is an illustration showing step 4 being performed and image 129 is a photograph showing a child setting a timer in accordance with step 7.

Map 120 also includes two activities 130. Activities 130 may comprise any number of activities, such as games, quizzes, puzzles, experiments, foreign language, social interaction, and instructions for doing one or more physical exercises, as mentioned above. In preferred embodiments, one or more (or all) of the activities relate to the instructions. Thus, for example, a word puzzle may be included with words relating to the preparation of the finished food. As another example, a science experiment may be performed using one or more of the ingredients for creating the finished food.

Figure 3:
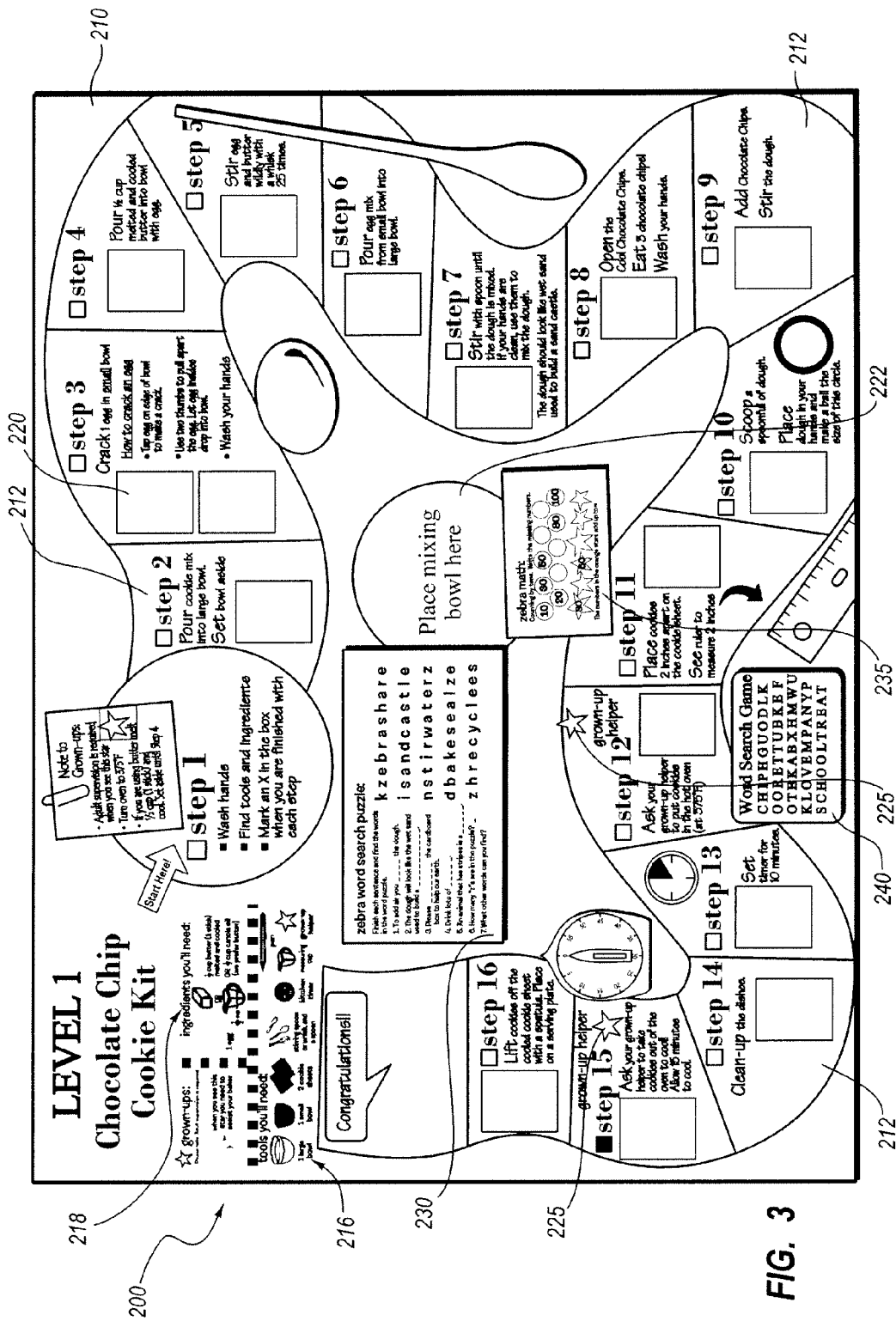
FIG. 3 depicts a first side of another embodiment of an instructional map.
Figure 4:
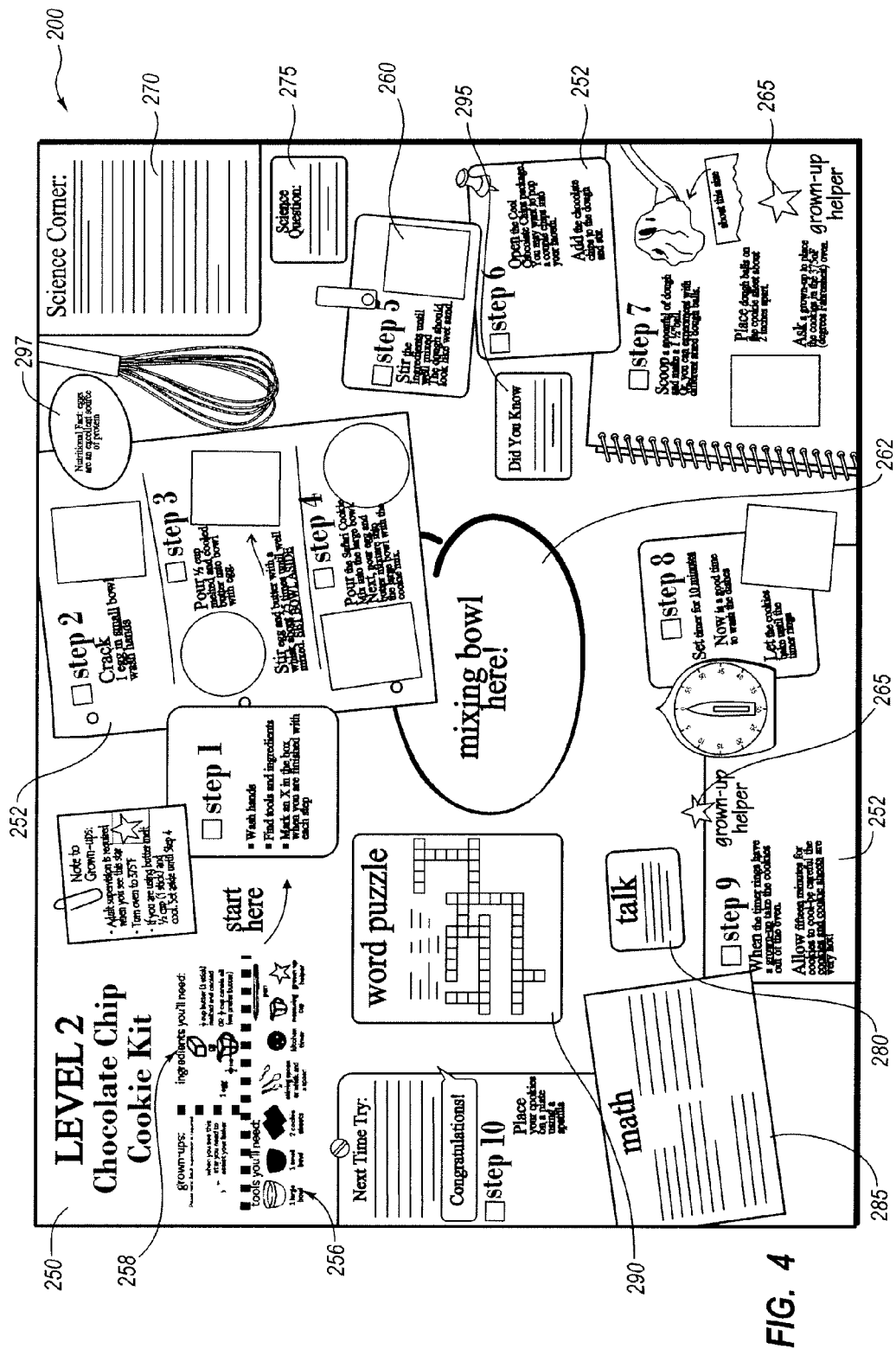
FIG. 4 depicts a second opposite side of the instructional map of FIG. 3.

FIGS. 3 and 4 depict opposite sides of an alternative embodiment of an instructional map 200. FIG. 3 depicts a first side 210 of instructional map 200 and FIG. 4 depicts a second side 250 of instructional map 200. The first side 210 is a "level one" side, which may be designed for children in a first age group, say children ages 4-8. The second side 250 is a "level two" side, which may be designed for children in a second age group, say children ages 9 and up. Accordingly, purchase of a single map (or kit including a map) may provide age-appropriate instructions and activities for a wide range of children according to the side selected.

A plurality of step-by-step instructions 212 are provided on the first side 210 for making chocolate chip cookies. Similarly, a plurality of instructions 252 are provided on the second side 250, also for making chocolate chip cookies. It should also be noted that both sets of instructions include a plurality of empty boxes corresponding with each of the plurality of instructional, which allows the user to place a mark, such as a check mark, within each of the boxes as each of the instructional steps are completed. However, the instructions 212 on side 210 differ from those on side 250 according to the suggested ages for the respective sides. Sides 210 and 250 also both include a list of suggested tools and a list of ingredients, shown at 216 and 218, respectively, on side 210 and at 256 and 258, respectively, on side 250.

Each of steps 212 and 252 is provided with an accompanying image relating to completion of the steps. Thus, as seen in FIG. 3, a plurality of images 220 are provided, each of which depicts its accompanying step being performed. Similarly, as seen in FIG. 4, a plurality of images 260 are provided depicting the various steps 252 being performed. Of course, other embodiments are contemplated in which less than all, or none, of the steps include such an accompanying image.

Both sides also include visual indicators that suggest a location on the map for placement of at least one of the suggested tools. More particularly, side 210 includes visual indicator 222 (a circle with text) and side 250 includes visual indicator 262, both of which suggest a location for placement of a mixing bowl to be used in mixing ingredients during the process of creating the finished food.

A plurality of stars 225 are also included on selected steps from first side 210. Stars 210 indicate that an adult should be involved in supervising and/or completing the selected steps. Side 250 also includes a plurality of stars 265. Although both sides of map 200 include two stars, it should be appreciated that in some embodiments, one side/level may include more stars or other adult-supervision indicators than the opposite side/level. Of course, in other embodiments, no such indicators are provided at all.

Both sides of map 200 may also include age-appropriate activities according to the age-ranges associated with their respective levels. For example, side 210 includes activities 230, 235, and 240.

Activity 230 comprises a word search puzzle. Word search puzzle 230 may provide a list of clues or fill-in-the-blank sentences with an accompanying word search. Completion of the activity may therefore comprise writing the words from the clues and/or filling in the blanks with the missing words and finding those words in the word search puzzle. One or more of the words may relate to the creation of the finished food if desired.

Activity 235 comprises a math puzzle or game. This activity may be completed by filling in the missing numbers and adding each of the numbers in the stars.

Activity 240 comprises a word search game. Word search game 240 may include one or more words that relate to the creation of the finished food if desired.

The opposite side of map 200 may include a plurality of activities designed for older children. Thus, with reference again to FIG. 4, side 250 includes activities 270, 275, 280, 285, and 290.

Activity 270 comprises a science experiment. Science experiment 270 may include science facts and information and/or a list of steps to perform in carrying out an experiment. One or more ingredients used to make the finished food may be also used in the science experiment in some embodiments. For example, if baking soda is used in preparing the finished food (such as cookies or cake), a science experiment using baking soda (with vinegar, for example) may be outlined in the activity text. The chemical reactions involved in the experiment may also be explained in the activity text. In addition, there may be questions, puzzles, fill-in-the-blanks, etc., so that children can write on the map as they perform the activity. Of course, in other embodiments, the science experiment steps may be outlined and explained in the activity without instructing the user to actually perform the experiment.

Activity 275 comprises a science question. The question may, but need not, relate to one or more of the steps 252. The question may also, or alternatively, relate to another of the activities. For example, science question 275 may draw upon the knowledge gained from science experiment 270 or otherwise relate to science experiment 270.

Activity 280 comprises a social interaction activity. This activity may, for example, direct a child to interact with an adult or friend by asking the adult or friend one or more questions. For example, the activity may direct a child to ask a friend, sibling, or parent who they admire and why.

Activity 285 comprises a math problem. Math problem 285 may, but need not, relate to one or more of the steps 252. For example, if a cookie recipe calls for a certain number of cups of flour, the math problem may provide a conversion chart for converting cups to tablespoons and ask the user how may tablespoons would be needed to make the cookies. The math problem 285 may alternatively, or additionally, include a problem unrelated to the food-making process.

Activity 290 comprises a crossword puzzle. Some or all of the words in crossword puzzle 290 may, but need not, relate to one or more steps of the food-making process. As shown in FIG. 4, the puzzle is completed directly on the map 200.

Map 200 may also include one or more facts, some of which may pertain to the recipe or food-making process. For example, side 250 of map 200 includes fact reports 295 and 297. The fact reports may contain any number of facts—such as nutritional facts, science facts, foreign language translations, math facts, etc.—which may be interesting to members of the target user group, some or all of which may also relate to the food being made and/or the process of making the food. For example, if the recipe being followed includes chocolate as an ingredient, the fact report might include information about chocolate, such as that chocolate contains antioxidants that help fight infections by preventing cell damage caused by free radicals.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The invention claimed is:

1. A method for creating a finished food, comprising the steps of:
   providing all dry ingredients for creating the finished food;
   providing an instructional map comprising a plurality of instructional steps for creating the finished food, wherein each of the plurality of instructional steps are visible on a single surface of the instructional map;
   placing the map over a work surface;
   completing each of the plurality of instructional steps for creating the finished food, wherein at least one of the plurality of instructional steps is performed on the instructional map;
   wherein the dry ingredients are transformed to a different state to create the finished food;
   completing an activity located on the instructional map, wherein the activity is distinct from actions to create the finished food, the activity comprising at least one of a game, a quiz, a puzzle, an experiment, a foreign language activity, a social interaction activity, and a physical exercise.

2. The method of claim 1, further comprising selecting a side of the instructional map according to an age of a child who will participate in creating the finished food.

3. The method of claim 1, further comprising:
   referencing an indication on the instructional map; and seeking the assistance of an adult in response to referencing the indication.

4. The method of claim 3, wherein the indication comprises a graphical symbol, and wherein the graphical symbol is linked with at least one of the instructional steps.

5. The method of claim 1, wherein the step of completing an activity relating to at least one of the instructional steps comprises writing on the instructional map.

6. The method of claim 1, further comprising placing a mark within each of a plurality of empty boxes corresponding with each of the plurality of instructional steps as each of the instructional steps are completed.

7. The method of claim 1, further comprising obtaining at least one ingredient for creating the finished food from a kit.

8. The method of claim 7, further comprising:
removing the instructional map from the kit; and
unfolding the instructional map.

\* \* \* \* \*